United States Patent
Suzuki et al.

(10) Patent No.: US 6,633,887 B2
(45) Date of Patent: *Oct. 14, 2003

(54) INFORMATION MANAGEMENT APPARATUS DIVIDING FILES INTO PARAGRAPH INFORMATION AND HEADER INFORMATION LINKED TO THE PARAGRAPH INFORMATION AND RECORDING MEDIUM THEREOF

(75) Inventors: Toshimitu Suzuki, Kawasaki (JP); Kazumi Saito, Kawasaki (JP); Sadao Yashiro, Kawasaki (JP); Takahide Muramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/082,167

(22) Filed: Feb. 26, 2002

(65) Prior Publication Data

US 2002/0083047 A1 Jun. 27, 2002

Related U.S. Application Data

(62) Division of application No. 08/816,497, filed on Mar. 13, 1997, now Pat. No. 6,370,536.

(30) Foreign Application Priority Data

Nov. 12, 1996 (JP) ............................................... 8-300705

(51) Int. Cl.⁷ ............................................... G06F 17/30
(52) U.S. Cl. ........................ 707/102; 707/100; 715/513
(58) Field of Search .................................. 707/100, 500, 707/513, 101, 102, 200

(56) References Cited

U.S. PATENT DOCUMENTS

| | | | |
|---|---|---|---|
| 5,119,491 A | 6/1992 | Iwai et al. ................... | 707/513 |
| 5,159,667 A | 10/1992 | Borrey et al. ................ | 707/500 |
| 5,548,508 A | 8/1996 | Nagami ......................... | 704/2 |
| 5,664,182 A | 9/1997 | Nierenberg et al. ......... | 707/102 |
| 5,680,612 A | 10/1997 | Asada et al. .................... | 707/3 |
| 5,694,609 A | 12/1997 | Murata ......................... | 707/513 |
| 5,701,500 A | 12/1997 | Ikeo et al. .................. | 707/517 |
| 5,704,060 A | 12/1997 | Del Monte .............. | 707/104.1 |
| 5,748,953 A | 5/1998 | Mizutani et al. ................ | 707/6 |
| 5,802,529 A | 9/1998 | Nakatsuyama et al. ..... | 707/513 |
| 5,812,999 A | 9/1998 | Tateno ............................ | 707/3 |
| 5,848,410 A | 12/1998 | Walls et al. .................... | 707/4 |
| 5,920,879 A | 7/1999 | Kyojima et al. ............. | 707/517 |
| 5,926,823 A * | 7/1999 | Okumura et al. ........... | 707/514 |
| 5,943,669 A * | 8/1999 | Numata ......................... | 707/5 |
| 5,956,726 A * | 9/1999 | Aoyama et al. ............. | 707/102 |
| 6,370,536 B1 * | 4/2002 | Suzuki et al. ................ | 707/101 |

FOREIGN PATENT DOCUMENTS

| | | |
|---|---|---|
| JP | 08-153111 | 6/1996 |
| JP | 08-255155 | 10/1996 |

OTHER PUBLICATIONS

Niyogi et al., Knowledge–Based Derivation of Document Logical Structure, IEEE electronic library, pp. 472–475, Aug. 1995.

Yashiro et al., A New Method of Document Structure Extraction Using Generic Layout Knowledge, IEEE electronic library, pp. 282–287, Apr. 1989.

* cited by examiner

Primary Examiner—Greta Robinson
(74) Attorney, Agent, or Firm—Staas & Halsey LLP

(57) ABSTRACT

An information management apparatus for managing a logical structure of information file wherein a plurality of pieces of paragraph information, to each of which header information is appended, are arranged. The information management apparatus provides file dividing means for making up a header management file including header information and a link. The header information is extracted from the logical structure of information file, and the link to the paragraph information to which the header information is appended is made up. The file dividing means makes up a plurality of paragraph files each including the paragraph information. Transmission control means, responsive to a transmission request for a logical structure of information file, transmits the header management file associated with the logical structure of information file and transmits based on a link included in the header management file; a paragraph file linked to the header management file.

9 Claims, 15 Drawing Sheets

```
<HTML>
<H1>Head1-1</H1>
<H2>head2-1</H2>
<P>This is a first paragraph. .....
.....</P>
<H1>Head1-2</H1>
<H2>head2-2</H2>
<P>This is a first paragraph. .....
.....</P>
<H1>Head1-3</H1>
<H2>head2-3</H2>
<P>This is a first paragraph. .....
.....</P>
<H1>Head1-4</H1>
<H2>head2-4</H2>
<P>This is a first paragraph. .....
.....</P>

</HTML>
```

Fig. 4

| FILE NAMES | HEADER MANAGEMENT FILE NAMES | PARAGRAPH FILE NAMES |
|---|---|---|
| A. HTML | A*. HTML | P1. html |
|  |  | P2. html |
|  | ................ | ............. |
| B. HTML | B*. HTML | P11. html |
|  |  | P12. html |
|  | ................ | ............. |

Fig. 5 (a)

```
<HTML>
<H1>Head1-1</H1>
<H2>head2-1</H2>
<H><A HREF="P1.html">LINK TO A PARAGRAPH
</A>
.....</P>
<H1>Head1-2</H1>
<H2>head2-2</H2>
<P><A HREF="P2.html">LINK TO A PARAGRAPH
</A>......</P>
<H1>Head1-3</H1>
<H2>head2-3</H2>
<P><A HREF="P3.html">LINK TO A PARAGRAPH
</A>......</P>
<H1>Head1-4</H1>
<H2>head2-4</H2>
<P><A HREF="P4.html">LINK TO A PARAGRAPH
</A>......</P>
```

Fig. 5 (b)

Head1-1
head2-1    LINK TO A PARAGRAPH

Head1-2
head2-2    LINK TO A PARAGRAPH

Head1-3
head2-3    LINK TO A PARAGRAPH

Head1-4
head2-4    LINK TO A PARAGRAPH

Fig. 5 (c)

```
<HTML>
<P>THIS IS A FIRST PARAGRAPH. .....
</P>
.....</HTML>
```
151

```
<HTML>
<P>THIS IS A FIRST PARAGRAPH. .....
</P>
.....</HTML>
```
152

```
<HTML>
<H1>Head1-1</H1>
<H2>head2-1</H2>
<P>This is a first paragraph. .....
.....</P>
<H1>Head1-2</H1>
<H2>head2-2</H2>
<P>This is a first paragraph. .....
.....</P>
<H1>Head1-3</H1>
<H2>head2-3</H2>
<P>This is a first paragraph. .....
.....</P>
<H1>Head1-4</H1>
<H2>head2-4</H2>
<P>This is a first paragraph. .....
.....</P>
</HTML>
```

```
<HTML>
<A HREF="A*.HTML">LINK TO THE PREVIOUS PARAGRAPH</A>
<P>・・・・・・・
・・・・・・＜ ／P＞
<A HREF="P2.HTML">LINK TO THE SUBSEQUENT PARAGRAPH</A>
＜ ／HTML＞
```

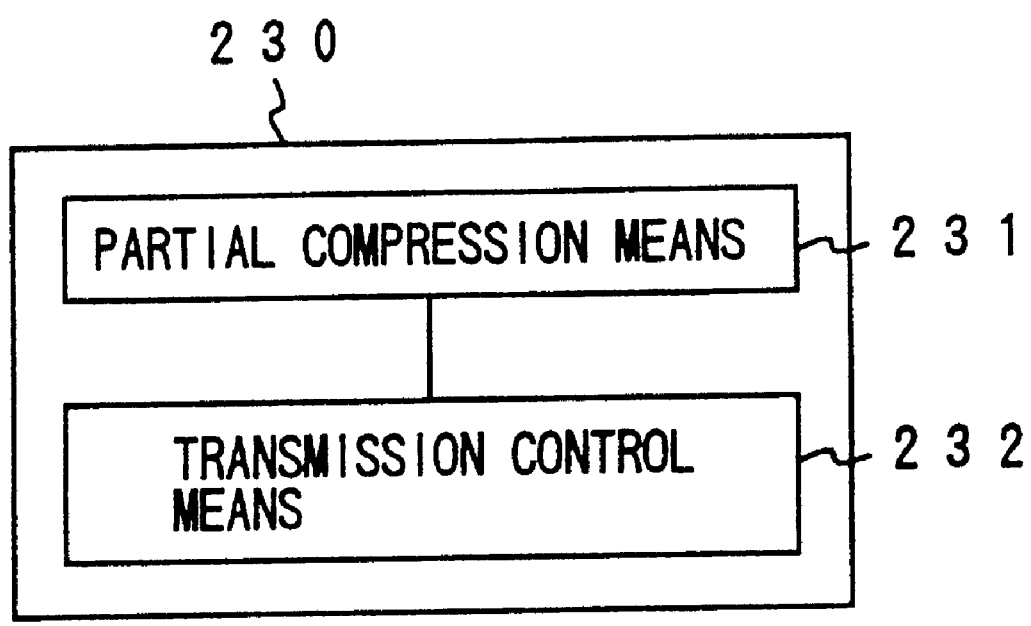

Fig. 12 (a)

```
<HTML>
<H1>Head1-1</H1>
<H2>head2-1</H2>
<P>This is a first paragraph. .....
.....</P>
<H1>Head1-2</H1>
<H2>head2-2</H2>
<P>This is a first paragraph. .....
.....</P>
<H1>Head1-3</H1>
<H2>head2-3</H2>
<P>This is a first paragraph. .....
.....</P>
<H1>Head1-4</H1>
<H2>head2-4</H2>
<P>This is a first paragraph. .....
.....</P>

</HTML>
```

Fig. 12 (b)

| |
|---|
| <HTML><br><H1>Head1-1</H1><br><H2>head2-1</H2> |
| COMPRESSED PARAGRAPH |
| <H1>Head1-2</H1><br><H2>head2-2</H2> |
| COMPRESSED PARAGRAPH |
| <H1>Head1-3</H1><br><H2>head2-3</H2> |
| COMPRESSED PARAGRAPH |
| <H1>Head1-4</H1><br><H2>head2-4</H2><br>...... |

FILE A. HTML

```
<HTML>
<H1>Head1-1</H1>
<H2>head2-1</H2>
<P>This is a first paragraph. .....
..... </P>
<H1>Head1-2</H1>
<H2>head2-2</H2>
<P>This is a first paragraph. .....
..... </P>
<H1>Head1-3</H1>
<H2>head2-3</H2>
<P>This is a first paragraph. .....
..... </P>
<H1>Head1-4</H1>
<H2>head2-4</H2>
<P>This is a first paragraph. .....
..... </P>

</HTML>
```

DISPLAY EXAMPLE

Fig.16

```
<HTML>
<TITLE>Home Page</TITLE>
<A HREF="http://www.1.or.jp/pub/information/a.html">Home1 Page</A>
<HTML>
```

INFORMATION MANAGEMENT APPARATUS DIVIDING FILES INTO PARAGRAPH INFORMATION AND HEADER INFORMATION LINKED TO THE PARAGRAPH INFORMATION AND RECORDING MEDIUM THEREOF

CROSS REFERENCE TO RELATED APPLICATION

This application is a divisional of application Ser. No. 08/816,497 now U.S. Pat. No. 6,370,536B1, filed Mar. 13, 1997, now allowed.

BACKGROUND OF THE INVENTION

1. Field of the Invention

The present invention relates to an information management apparatus for managing information files, and information management program recording mediums for storing information management programs to manage information files.

2. Description of the Related Art

Recently, computer and communication technologies have been advancing and also document description languages such as a HTML have been developing. In the content of these changes, it often happens, that a general user accesses to a large amount of information stored in a server to retrieve information of interest from among the large amount of information. In this way, the information of interest can be obtained via various types of networks such as a telephone line and the LAN. As a recent multimedia technology develops, information as an object of a communication is directed to a so-called hypertext. Such hypertext includes a still picture, a dynamic picture image or an animation, sound and the like, in addition to text information. Thus nowadays there is a tendency that a size of an information file is increasingly large. As a result, a transfer of the information file requires much time. Also, there is a tendency that an occupation ratio of a communication channel per user in a communication network is increased. Thus, there is a fear that a transfer rate is decreased.

In order to solve the foregoing problems, there has been proposed an approach in which the information file is divided into a plurality of small unit information files. Each of the small unit information files includes a hyper link indicating the context of the unit information file, thereby reducing a file transfer unit by one. However, according to this scheme, when a user makes up an information file, the user has to make up the information file taking account of the file division. Also, after making up the information file, there is further a need to perform the file dividing operations and making up operations of index information to connect the divided individual files to one another when they are read out. Thus, this scheme has the drawback that these operations are burden to the person who makes up the information file.

In some cases, while the size of an information file including information to be referred to is large, there is no need to transfer the information file in its entirety. On the contrary, it is sufficient to transmit a part of the information file. However, according to the prior art, even in such a case, there is no way other than to transfer the information file in its entirety.

FIG. 14 is a typical illustration of an information providing system utilizing the conventional WWW (World Wide Web).

As shown in FIG. 14, according to the information providing system utilizing the conventional WWW, a WWW server is connected via a network, such as a LAN and a public line of telecommunication, to a client computer. Information files are stored in and managed at the WWW server end. The WWW server transmits an information file desired by a user in accordance with a transmission request issued from the client computer.

FIGS. 15(a) and (b) are illustrations of the contents of an information file to be managed by the conventional WWW server and a display example of such an information file, respectively.

FIG. 15(a) shows a part of the contents of an information file "A.HTML" to be managed by the WWW server. The information file "A.HTML" is described in accordance with a format of HTML. The file starts with a tag represented by <HTML> appearing on the first line and terminates with a tag represented by </HTML > appearing on the last line, as shown in FIG. 1(a). On the second line of the file, a first hierarchy of header information "Head 1-1", which corresponds to a big headline, is described between tags <H1 and </H1. On the third line of the file, a second hierarchy of header information "head 2-1, which corresponds to a middle headline, is described between tags <H2> and </H2>. On the fourth line and so forth of the file, a paragraph associated with those types of header information, that is, the text of the hypertext, is described between tags <P> and </P>.

Consider the lines subsequent to the line on which the tag </P> indicative of termination of the first paragraph appears. On those lines, the header information "Head 1-2" and the header information "head 2-2", which are associated with the second paragraph, and the paragraph associated with those types of header information, are sequentially described. In the same way, pieces of the header information associated with the third and fourth paragraphs, and the paragraphs associated with those types of header information, are sequentially described.

In this manner, in the WWW server, an information file is divided and managed. The file has a logical structure in several sorts of hierarchy of pieces of unit information, which are independent of one another on a logical basis, for example, a title, a header and a paragraph. The file is divided and managed by means of appending logical tags according to the sorts of unit information, that is, markup tags based on an HTML grammar such as <TITLE> </TITLE>, <H> </H>, and <P> </P>.

FIG. 15(b) is an illustration of a display example in which the information file "A.HTML" of the WWW server end is transferred to the client computer end in accordance with the request of the user. The file is displayed on a screen through the WWW browser (HTML processing software) of the client computer end. In this manner, the respective tags are deciphered so that the header information and the associated paragraph information are displayed.

The contents displayed on the screen shown in FIG. 15(b) is substantially the same as the contents of the original before an HTML formalization into the information file "A.HTML," managed by the WWW server and shown in FIG. 15(a). The original is managed by the WWW server in the form of "A.HTML" through the HTML formalization. The original is transferred to the client computer so as to be edited into the state of the original in accordance with the the WWW browser and then displayed.

The file "A.HTML" shown in FIG. 15(a) is managed on the WWW server as follows.

FIG. 16 is an illustration showing an example of descriptions of link information indicating the location of the information file.

<HTML> on the first line denotes that the subsequent document is an HTML document. <TITLE> Home Page </TITLE> on the second line denotes that the title of this document is a "Home Page".<A HREF="http://www.1.or.jp/pub/information/a. html">Home1 Page</A> denotes an anchor for defining a link destination and a link source of a so-called hyper link. In the anchor, an address of the link source and an address of the link destination are described in the format of a URL (Uniform Resource Locater). That is, according to the example shown in FIG. 16, the link source is a file represented by "http://www.1.or.jp/pub/information/a. html", and the link destination is Home1 Page.

As described above, describing (i.e., inserting) into an information file an address of an information file to be linked to the former information file makes it possible to implement a hyper link between the information files. Suppose that the user clicks, using a mouse or the like, a portion "Home1Page" reflecting the link information shown in FIG. 16 and displayed on a display screen of the client computer. When this action is performed the information file "a. html" is transferred from the server www.1 to the client computer, and the associated information message is displayed on the screen of the client computer.

When the WWW server transfers a file designated by the user to the the client computer, even in a case where the designated file "a. html" is a very large size document, the file transmission is performed as indicated, even with such a size. In this case, substantial time for transmission is required.

In view of the foregoing, and in order to solve this problem, it happens that a file is divided into a plurality of pieces of file and managed by a server. In such a case, as will be described hereinafter, prior to dividing the file, first an index file is made up. Then individual header files and paragraph files are made up on the basis of the index file.

FIG. 17 is an illustration showing the situation of the hyper link according to the conventional index file and individual header files.

As seen from FIG. 17, the file is of a tree structure of three hierarchies comprising an index file, individual header files and paragraph files. The index file shown at the left of FIG. 17 corresponds to a table of contents of the information file in its entirety. The index file, of the individual header files and the paragraph files (text) are linked together. FIG. 17 shows, by way of example, "1-1.html" is linked to the individual header file of the title "Head 1-1" by an anchor tag described on the second line of the index file. Also, "1-1.html" is linked to the paragraph file of the title "1-1" by an anchor tag described on the third line of the individual header file of the title "Head 1-1". In this manner, making up a plurality of divided paragraph files and linking those files together make it possible to reduce the size of the individual files, thereby improving a transmission response.

However, in making up file groups having a complicated structure as mentioned above, it is necessary for an information tabulator to manually perform operations such that files divided from the start are made up and then those files are combined to form a complete file. Alternatively, a complete file is made up on a batch basis and then divided into a plurality pieces of file. Further, operations are needed for making up the index file and the individual header file in addition to the file dividing task. These tasks will be a great burden to the information tabulator.

SUMMARY OF THE INVENTION

In view of the foregoing, it is therefore an object of the present invention to provide an information management apparatus capable of automatically dividing a large size of information file into a plurality of pieces of file and linking those files together, and to provide information management program recording mediums for storing information management programs to manage information files.

To attain the above-mentioned object, according to the present invention, as the first information management apparatus, there is provided an information management apparatus for managing a logical structure of information file wherein a plurality of pieces of paragraph information, to each of which header information is appended, are arranged. Said information management apparatus comprises:

a file dividing means for making up a header management file including header information and a link in such a manner that the header information is extracted from the logical structure of information file and the link to the paragraph information to which the header information is appended is made up, and also making up a plurality of paragraph files each including the paragraph information.

In the first information management apparatus mentioned above, it is preferable that the information management apparatus further comprises a transmission control means responsive to a transmission request for a logical structure of information file for transmitting the header management file associated with the logical structure of information file, and for transmitting, upon receipt of a transmission request based on a link included in the header management file, a paragraph file linked to the header management file.

In the first information management apparatus mentioned above, it is acceptable that said file dividing means includes a compressing means for compressing the pieces of paragraph information, and makes up the paragraph files in which the pieces of paragraph information are stored in form of compression. Further, it is also acceptable that said file dividing means includes a link making up means for making up a link to a previous paragraph information and a link to a subsequent paragraph information with respect to each of the plurality of pieces of paragraph information, and makes up the paragraph files in which the pieces of paragraph information and the associated links are stored.

As mentioned above, according to a first information management apparatus, there is provided the file dividing means for making up a header management file including header information and a link in such a manner that the header information is extracted from the logical structure of information file and the link to the paragraph information to which the header information is appended is made up, and also making up a plurality of paragraph files each including the paragraph information. This feature makes it possible to provide header information for users at extremely shorter time as compared with a scheme in which the original information file is transmitted in its entirety, through such a way that upon receipt of a transmission request from a client computer, first, a header management file is transmitted, and then upon receipt of a transmission request based on a link included in the header management file, a paragraph file is transmitted. Further, the paragraph file is also divided to be small size. Thus, it is permitted to transmit only portions requested by a client computer. Therefore, a time for transmission of the paragraph itself is also reduced thereby implementing an information providing system excellent in efficient. Furthermore, according to the first information management apparatus, there are automatically performed works for making up the header management files and the paragraph files from the original information file. Thus, it is possible to solve the problem as to a burden or load of the information tabulator.

To attain the above-mentioned object, according to the present invention, as a second information management apparatus, there is provided an information management apparatus information management apparatus for managing a logical structure of information file wherein a plurality of pieces of paragraph information, to each of which header information is appended, are arranged. The information management apparatus comprises:

a partial compression means for making up an alternate file to be substituted for a logical structure of information file by means of compressing partially paragraph information sections, except the header information, of the logical structure of information file.

In the second information management apparatus mentioned above, it is preferable that the information management apparatus further comprises a transmission control means responsive to a transmission request for a logical structure of information file for transmitting the alternate file associated with the logical structure of information file, the alternate file being made by said partial compression means, instead of the logical structure of information file requested.

As mentioned above, according to the second information management apparatus, there is provided the partial compression means for making up an alternate file to be substituted for a logical structure of information file by means of compressing partially paragraph information sections, except the header information, of the logical structure of information file. This feature makes it possible to provide information for users at extremely shorter time as compared with a scheme in which the original information file is transmitted in its entirety, through such a way that upon receipt of a transmission request an alternate file made up by the partial compression means is transmitted.

To attain the above-mentioned object, according to the present invention, as the first information management program recording medium, there is provided an information management program recording medium for storing an information management program to manage a logical structure of information file wherein a plurality of pieces of paragraph information, to each of which header information is appended, are arranged. Said information management program comprises:

a file dividing means for making up a header management file including header information and a link in such a manner that the header information is extracted from the logical structure of information file and the link to the paragraph information to which the header information is appended is made up, and also making up a plurality of paragraph files each including the paragraph information.

In the first information management program recording medium, it is preferable that said information management program further comprises a transmission control means responsive to a transmission request for a logical structure of information file for transmitting the header management file associated with the logical structure of information file, and for transmitting, upon receipt of a transmission request based on a link included in the header management file, a paragraph file linked to the header management file.

To attain the above-mentioned object, according to the present invention, as a second information management program recording medium, there is provided an information management program recording medium for storing an information management program to manage a logical structure of information file wherein a plurality of pieces of paragraph information, to each of which header information is appended, are arranged. This information management program comprises:

a partial compression means for making up an alternate file to be substituted for a logical structure of information file by means of compressing partially paragraph information sections, except the header information, of the logical structure of information file.

In the second information management program recording medium, it is preferable that said information management program further comprises a transmission control means responsive to a transmission request for a logical structure of information file for transmitting the alternate file associated with the logical structure of information file, the alternate file being made by said partial compression means, instead of the logical structure of information file requested.

BRIEF DESCRIPTION OF THE DRAWINGS

FIG. 4 is a schematic diagram showing a management table in connection with the information management apparatus according to the first embodiment of the present invention;

FIGS. 5(a)–(c) are illustrations of header management files transmitted to a client computer by the transmission control means in the information management apparatus according to the first embodiment of the present invention, and the divided paragraph files;

FIG. 11 is a schematic diagram of an information management program having a partial compression means and a transmission control means, the information management program being provided for an information management apparatus according to the fourth embodiment of the present invention;

FIGS. 12(a) and (b) are file construction views of the original file and the alternate file in connection with the information management apparatus according to the fourth embodiment of the present invention, respectively;

FIG. 16 is an illustration showing an example of descriptions of link information indicating the location of the information file.

DETAILED DESCRIPTION OF THE PREFERRED EMBODIMENTS

Hereinafter, there will be described embodiments of the present invention.

Figure 1:
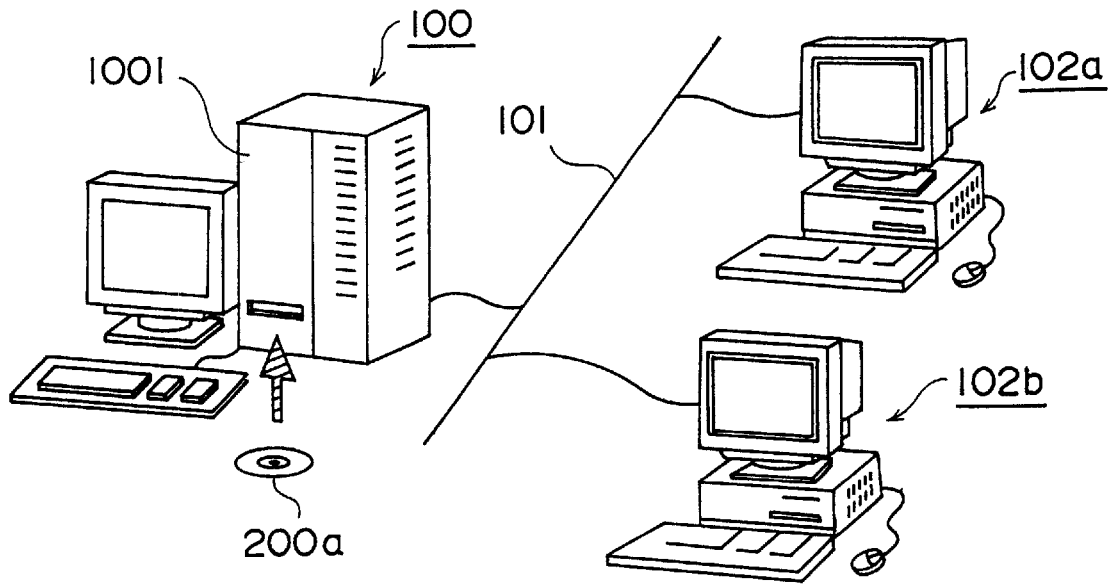
FIG. 1 is a schematic diagram of an information management apparatus applicable on a common basis to the embodiments of the present invention.

FIG. 1 is a schematic diagram of an information management apparatus applicable on a common basis to the embodiments of the present invention.

In FIG. 1, an information management apparatus 100 serves as a server computer having a WWW server function. In the WWW server, a logical structure information file is managed and transmitted via a network 101 to client computers 102a, 102b, . . . in accordance with a transmission request from the client computers 102a, 102b, . . . .

In the information management apparatus 100, there is prepared a CD-ROM type of information management program recording medium 200a for storing an information management program for the information management apparatus 100. The information management program recording medium 200a is read through a CD-ROM driving device of the information management apparatus 100 into a storage 1001 of the information management apparatus 100. Thereby, the information management program is incorporated into the information management apparatus 100.

Hereinafter, there will be explained by way of example an information management apparatus utilizing a WWW, that is, a distributed database system in which multimedia information messages are mutually communicated using a Hyper Text Markup Language (HTML). It is noted, however, that the present invention is not restricted to only the information management apparatus utilizing a WWW, but applicable also to an information management apparatus in concentrated systems. Further, with respect to the language used herein, it is not restricted to HTML and it is acceptable that markup languages other than HTML are used.

Usually, each of the computers connected to the network 101 is provided with dual functions of the WWW server function and the WWW browser function. Each of the computers usually is operable as a server computer or a client computer in accordance with the user's operation, thereby enabling a two-way communications among the computers.

The information management apparatus 100 has a file dividing means and a transmission control means, which will be described hereinafter.

Figure 2:
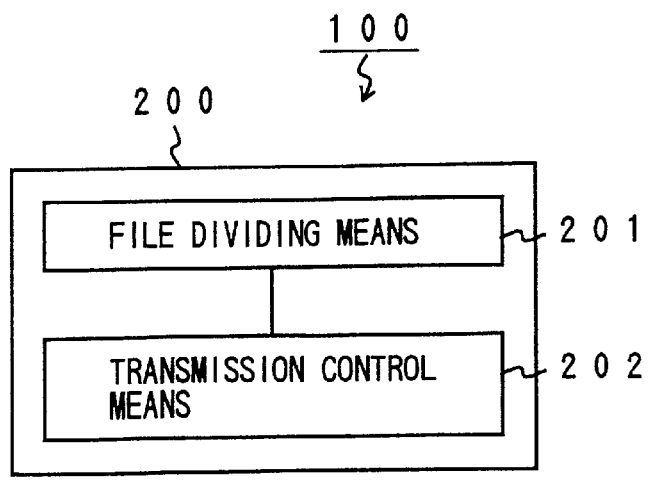
FIG. 2 is a schematic diagram of an information management program having a file dividing means and a transmission control means, the information management program being provided for an information management apparatus according to the first embodiment of the present invention.

FIG. 2 is a schematic diagram of an information management program having a file dividing means and a transmission control means. The illustrated information management program is provided for an information management apparatus according to the first embodiment of the present invention.

Incorporated into the information management apparatus 100 is an information management program 200 stored in the information management program recording medium 200a shown in FIG. 1. As shown in FIG. 2, the information management program 200 has a file dividing means 201 and a transmission control means 202. The functions of the file dividing means 201 and the transmission control means 202 will be described hereinafter in conjunction with examples of the file.

Figure 3:
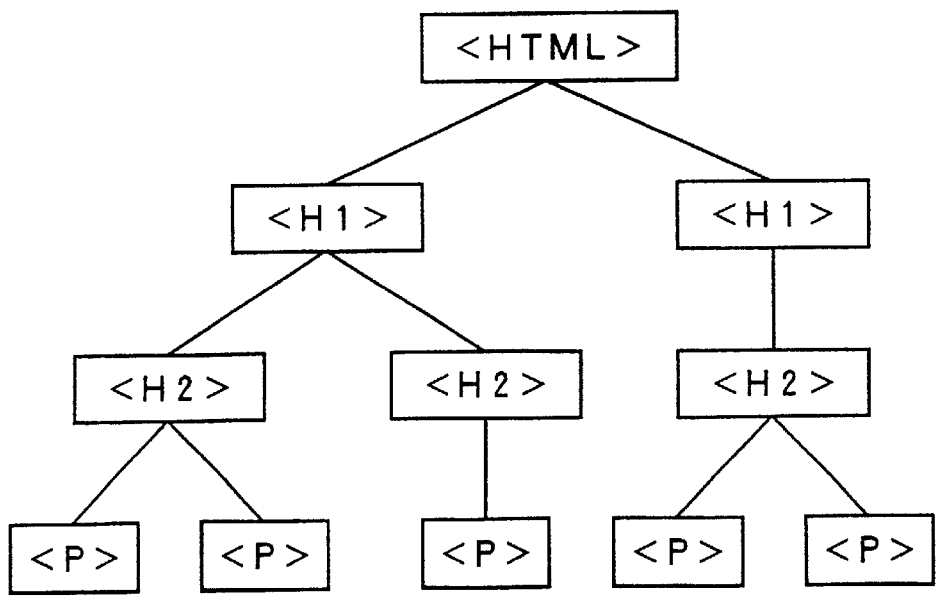
FIGS. 3(a) and (b) are diagrams showing a document file managed by the information management apparatus according to the first embodiment of the present invention, and a hierarchical structure tree of the document file, respectively.

FIGS. 3(a) and (b) are diagrams showing a document file managed by the information management apparatus according to the first embodiment of the present invention, and a hierarchical structure tree of the document file, respectively.

FIG. 3(a) shows a document file "A. HTML". On the other hand, FIG. 3(b) shows a hierarchical structure tree of the document file "A. HTML".

Figure 15:
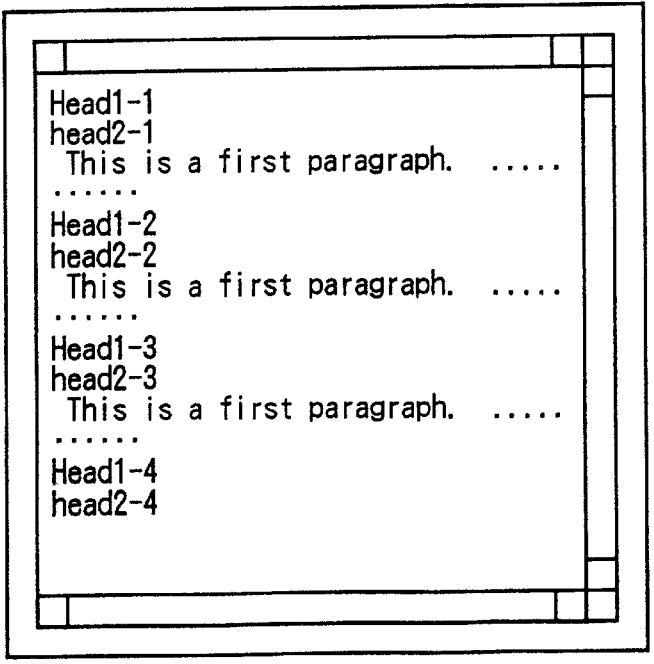
FIGS. 15(a) and (b) are illustrations of the contents of an information file to be managed by the conventional WWW server and a display example of such an information file, respectively.
Figure 17:
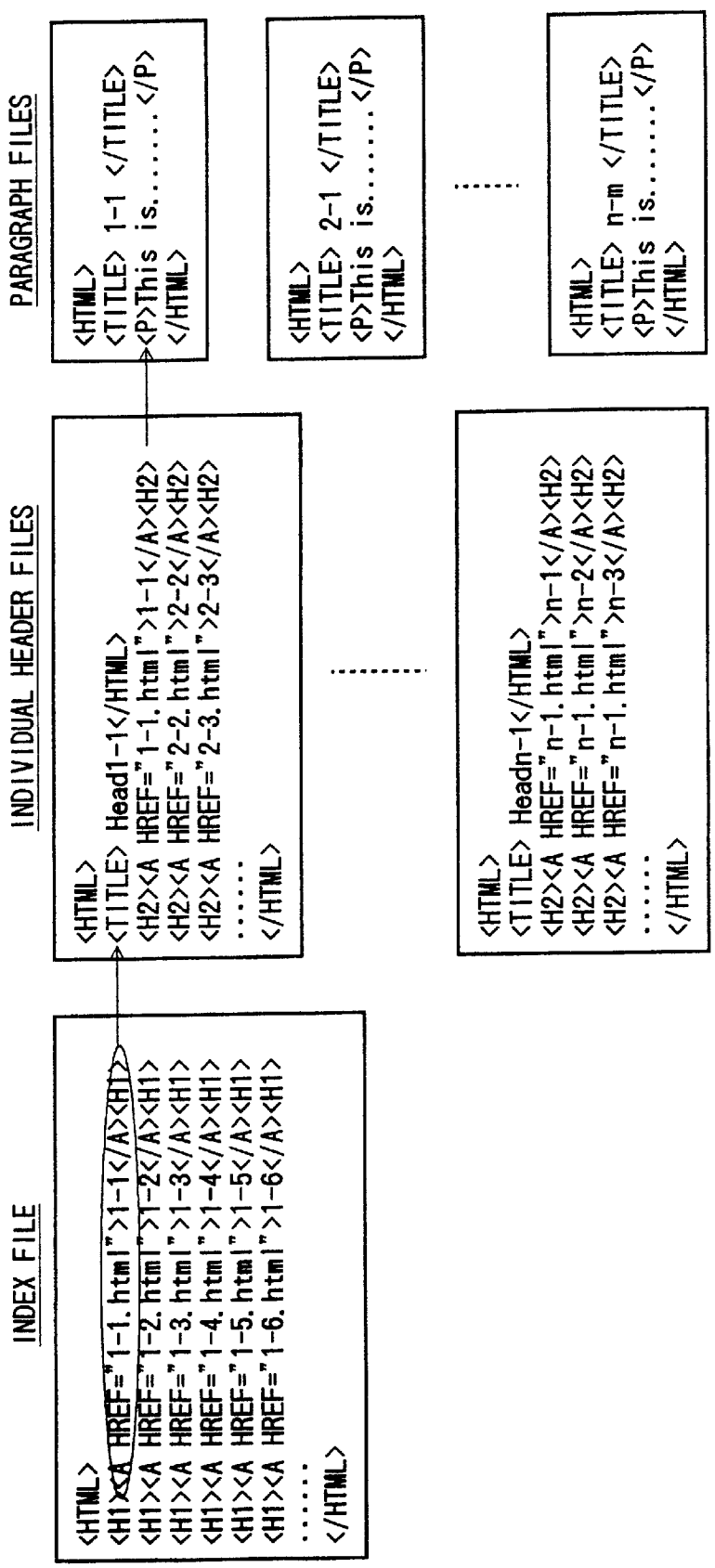
FIG. 17 is an illustration showing the situation of the hyper link according to the conventional index file and individual header files.

As shown in FIG. 3(a), the document file "A. HTML" is described in accordance with the HTML grammar. The file is a logical structure file comprising a plurality of pieces of unit information to each of which header information is appended on the basis of HTML markup tags. In the document file "A.HTML" a logical structure file having the same contents as that of FIG. 15(b) is divided into blocks on each unit information, and header information is appended to each unit information. The information management apparatus according to the first embodiment of the present invention manages information files in such a form.

The information file having the above-mentioned logical structure forms a hierarchical tree structure. As shown in FIG. 3(b), the document file "A.HTML" is provided in the form of a total of four hierarchies of tree structure comprising two hierarchies of headers and paragraphs located below those headers. A management table for managing link information among the hierarchies is made up on the basis of such a logical structure to manage the respective files.

FIG. 4 is a schematic diagram showing a management table in connection with the information management apparatus according to the first embodiment of the present invention.

In the management table shown in FIG. 4, original file names (A.HTML, B.HTML, . . . ), the respectively associated header management file names (A*.HTML, B*.HTML, . . . ), and paragraph file names (P1. html, P2. html, . . . ) each managed by the associated one of the header management files, are described in accordance with the hierarchical structure of the respective paragraphs.

The respective paragraph files are made up as follows. Specifically, according to the information management apparatus of the first embodiment of the present invention, the file dividing means 201 shown in FIG. 2 extracts pieces of header information from an information file having the hierarchical structure as shown in FIGS. 3(a) and (b). The file dividing means 201 and makes up links to pieces of paragraph information to each of which the associated header information is appended. Thereby, the file dividing means 201 makes up a header management file including pieces of header information and the links and also making up a plurality of paragraph files each including the paragraph information. In this manner, the file dividing means 201 makes up one header management file and a plurality of paragraph files by means of dividing a single information file. The header management files and paragraph files thus made up are registered in the management table shown in FIG. 4 to be managed.

Incidentally, it is not always needed that the above-mentioned management table is previously prepared at the WWW server end. For example, it is acceptable that the management table is made up on the basis of the original file (cf. FIG. 3(a)) whenever a user issues a reference request. However, from the viewpoint of the response, it is preferable that the file dividing means 201 is executed so that the management table is previously prepared at the WWW server end. Alternatively, it is acceptable to make up tables and store them instead of preparing the management tables on all the files from the start. That is, while management tables are made up upon receipt of a user's reference request, a management table once made up is stored in the storage 1001 of the WWW sever and is prepared for a subsequent reference request from the user.

Next, there will be explained the function of the transmission control means in the information management apparatus according to the first embodiment of the present invention.

A reference request of a file "a.html" is received at the WWW server end. Upon receipt of the request, the transmission control means 202 (cf. FIG. 2) provided in the information management apparatus 100 (cf. FIG. 1) reads the header management file "A*.HTML". The file "A*.HTML" is stored in the storage 1001 of the WWW server and is ready. The transmission control means 202 referring to the management table shown in FIG. 3 and transfers the same to the client computer.

FIGS. 5(a)–(c) are illustrations of header management files transmitted to a client computer by the transmission control means 202 in the information management apparatus according to the first embodiment of the present invention, and the divided paragraph files.

FIG. 5(a) shows a part of the header management file "A*.HTML" transmitted to a client computer. This header management file comprises header sections and link information to paragraph files divided from the original file and independent of one another, and including no paragraph section of the original file. Specifically, on the second and third lines of FIG. 5(a) there are described a big headline ∓Head 1-1" and a middle headline "Head 2-1", respectively. On the fourth to sixth lines of FIG. 5(a) there is described only an anchor tag (or a tag, sandwiched between <A> and </A>, for defining an address of a link destination) for defining a link destination (paragraph file "P1.html") associated with those headers. Similarly, on line 7 and subsequently there are described a big headline "Head 1-2", a middle headline "Head 2-2", and an anchor tag (indicating a link to the paragraph file "P2.html") associated with those headers. Such a header management file "A*.HTML" is transferred by the transmission control means 202 (cf. FIG. 2) from the WWW server to the client computer. The client computer displays the screen of FIG. 5(b) on the basis of the header management file thus transferred.

FIG. 5(b) shows a display image, on a display screen of the client computer, of the management file "A*.HTML" transferred to the client computer. As shown in FIG. 5(b), on the screen, there are displayed the header portions and the link portions each to the associated paragraph. The link portions underlined are emphatically displayed on an actual screen with blue characters and underlines in accordance with the WWW browser. Assume that the user looks at this screen, and clicks with a mouse or the like, for example, on a portion "Link to a paragraph" emphatically displayed on the third line. The transmission request for the clicked paragraph file is transmitted from the client computer to the WWW server. The transmission control means 202 (cf. FIG. 2) of the WWW server reads the designated paragraph file from the storage 1001 (cf. FIG. 1) and transmits the same to the client computer in compliance with the transmission request.

FIG. 5(b) shows paragraph files divided on the basis of the management table shown in FIG. 4. For example, a paragraph file 151 corresponds to the file "P1. html" described on line 1, right column of the management table shown in FIG. 4. And paragraph file 152 corresponds to the file "P2. html" described on line 2, right column of the management table shown in FIG. 4.

A file division of the original file into a plurality of paragraph files is performed as follows. For example, in connection with the document file "A. HTML" shown in FIG. 3(a), analysis of the tag of the document file "A. HTML" makes it clear that the second line to the third line are associated with the header portions and the fourth line to the fifth line are associated with the first paragraph. Hence, the first paragraph is cut out from the original file and is named "P1. html" in paragraph name. The paragraph "P1. html" is stored in the storage 1001 (cf. FIG. 1). Likewise, it is understood that the sixth line to the seventh line are associated with the header portions and the eighth line to the ninth line are associated with the second paragraph. Hence, the second paragraph is cut out from the original file and is named "P2. html" in paragraph name. The paragraph "P2. html" is stored in the storage 1001. Thereafter, in a similar fashion, paragraphs "P3. html", "P4. html", . . . are made up and stored in the storage 1001.

According to the present embodiment, a file division of the original file into a plurality of paragraph files is performed simultaneously when the management table is made up in accordance with a user's reference request. However, in a similar fashion to that of the management table, it is acceptable that the file division is performed beforehand on all the information files stored in the server.

Figure 6:
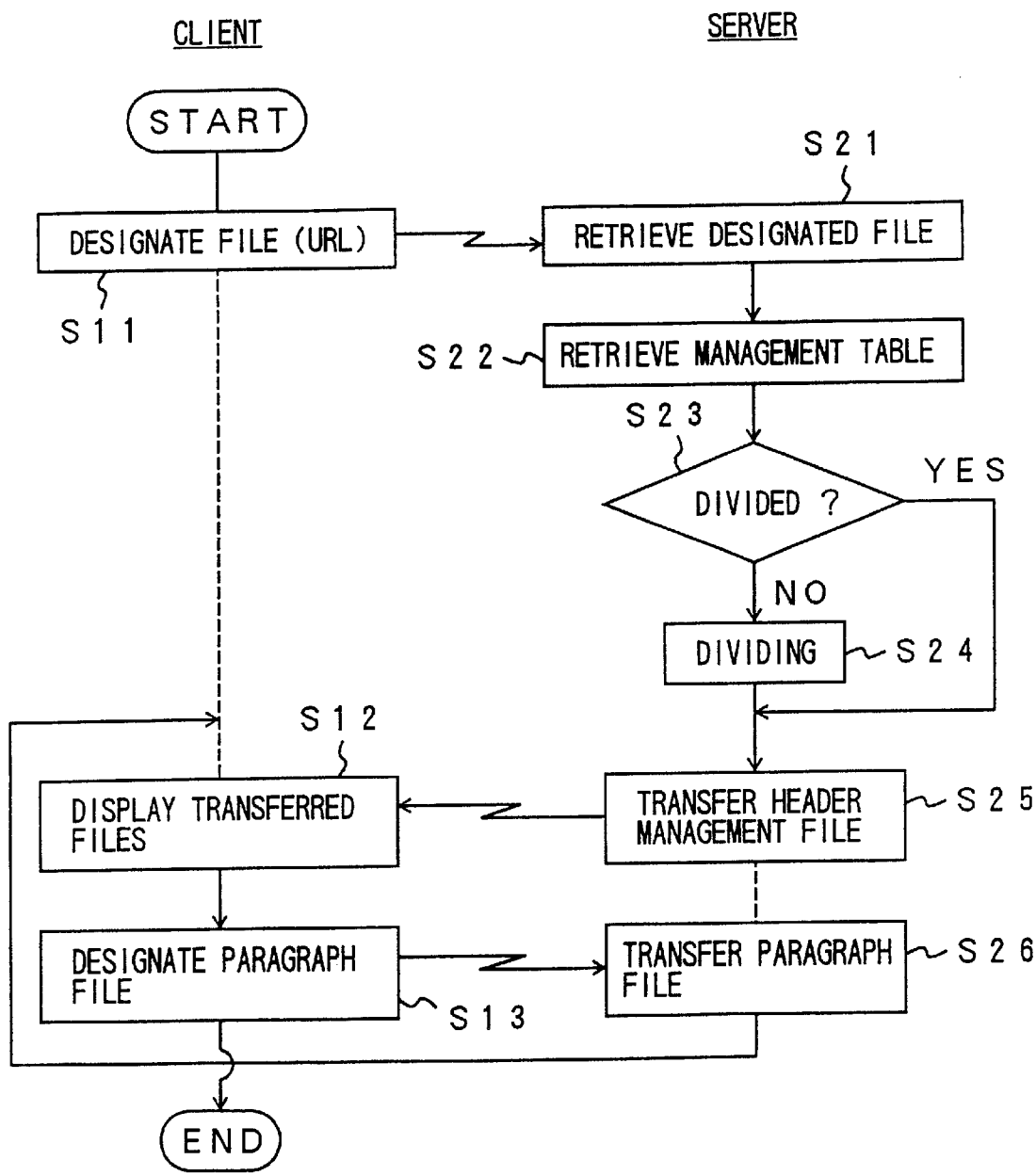
FIG. 6 is a flowchart useful for understanding a procedure of the file transfer in connection with the information management apparatus according to the first embodiment of the present invention.

FIG. 6 is a flowchart useful for understanding a file transfer procedure in connection with the information management apparatus according to the first embodiment of the present invention.

As shown in FIG. 6, when processing starts in accordance with a transmission request of a client computer end, a file name is designated on the basis a URL format (step S11). The designated file name is transmitted to a WWW server, and the WWW server end performs a retrieval of the designated file (step S21). If the designated file is not stored in the WWW server, the processing is terminated. On the other hand, if the designated file is stored in the WWW server, the process goes to step S22 in which it is retrieved as to whether the designated file is registered in the management table (cf. FIG. 4). In step S23, it is determined whether the designated file has been divided already, that is, whether the header management file (cf. FIG. 5(a)) has been made up already and a file division into the paragraph files has also been completed. In the event that the designated file has been divided already, the program proceeds to step S25 in which the header management file is transferred to the client computer. As a result the determination in step S23, if a file division of the designated file is not yet accomplished, the program proceeds to step S24. At step 24, making up of the header management file and the file division of the designated file are carried out. When the making up of the header management file and the file division have been completed, the process goes to step S25 in which the header management file is transferred to the client computer. Incidentally, at this time point the paragraph files are not transferred.

When the header management file is transferred from the WWW server to the client computer, a WWW browser of the client computer end analyzes the header management file to display on a display screen the contents (cf. FIG. 5(b)) of the header management file thus transferred (step S12). Now, assume that the user looks at this screen, and clicks with a mouse or the like a portion "Link to a paragraph". The clicked paragraph file is designated (step S13). The designated paragraph file is informed to the WWW server in the form of URL format. The WWW server analyzes information as to the designated paragraph file, and reads the designated paragraph file from the storage 1001 (cf. FIG. 1) and transmits the same to the client computer (step S26). Upon receipt of a transfer of the paragraph file, the client computer displays on its screen the contents of the paragraph file (step S12). Further, in the event that the user wishes to continue reading out of the files, it is permissible to continue processings following the paragraph file designation in step S13.

In this manner, according to the present embodiment, even if the original file is of a large file size, the original file is divided into a header management file and a plurality of paragraph files, so that the divided small size of files are transferred. Thus, according to the present invention, it is possible to improve transfer response. Further, it is possible to significantly reduce the burden on the information tabulator, since the file division is automatically carried out by WWW servers.

Next, there will be explained an information management apparatus according to the second embodiment of the present invention.

Figure 7:
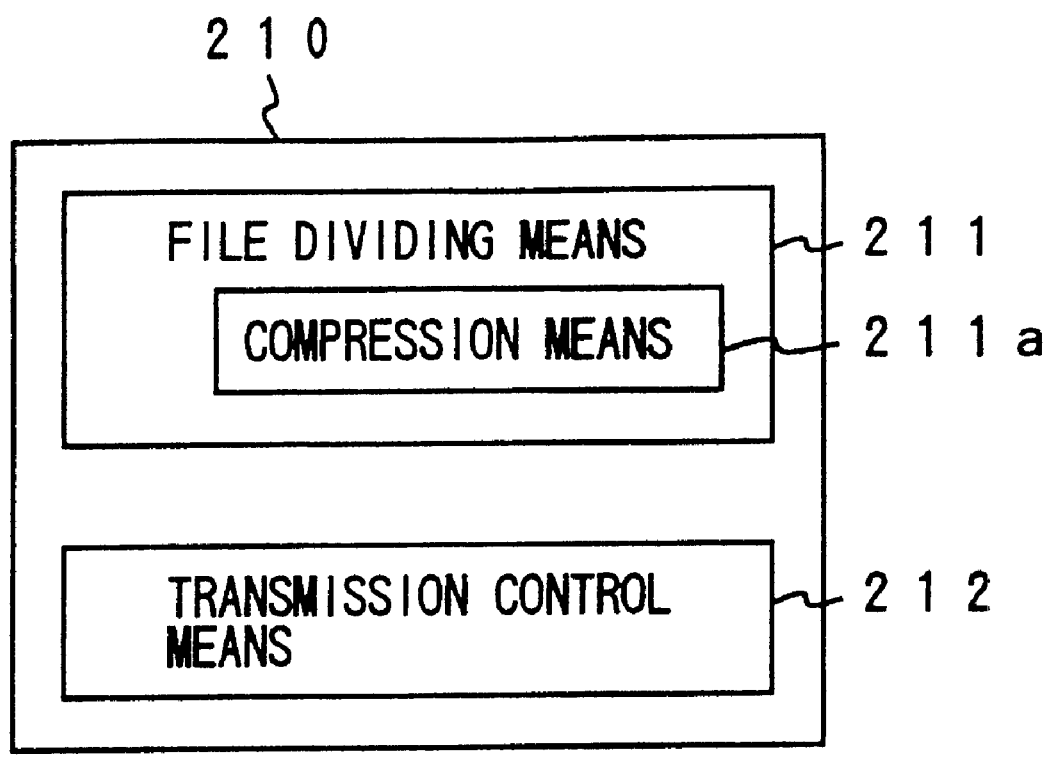
FIG. 7 is a schematic diagram of an information management program having a file dividing means and a transmission control means, the information management program being provided for an information management apparatus according to the second embodiment of the present invention.

FIG. 7 is a schematic diagram of an information management program having a file dividing means and a transmission control means. The information management program is provided for an information management apparatus according to the second embodiment of the present invention.

Incorporated into the information management apparatus 100 shown in FIG. 1 is an information management program 210 stored in the information management program recording medium 200a also shown in FIG. 1. As shown in FIG. 7, the information management program 210 has a file dividing means 211 and a transmission control means 212. The function of the transmission control means 212 is the same as that of the transmission control means 202 explained in connection with the first embodiment of the present invention. But, the file dividing means 211 includes a compression means 211a for compressing pieces of paragraph information. Thus, file dividing means 211 is somewhat different in its function from the file dividing means 201 explained in connection with the first embodiment of the present invention.

Thus, according to the second embodiment of the present invention, since there is provided the compression means 211a, the divided paragraph files are managed in the form of compression. This feature makes it possible to improve the management efficiency of the paragraph files in the WWW server as compared with the first embodiment of the present invention, and also to improve the transfer efficiency of the paragraph files to a client computer. Incidentally, the paragraph files transferred in the form of compression are "thawed," or expanded, in accordance with a WWW browser function of the client computer and then displayed on a display screen.

Figure 8:
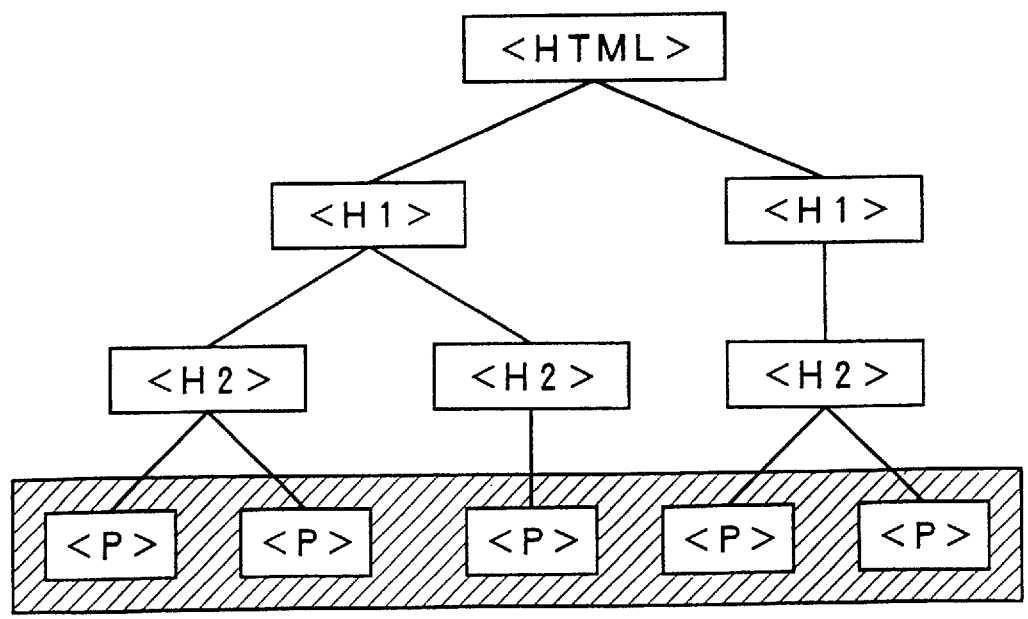
FIGS. 8(a) and (b) are diagrams showing a document file managed by the information management apparatus according to the second embodiment of the present invention, and a hierarchical structure tree of the document file, respectively.

FIGS. 8(a) and (b) are diagrams showing a document file managed by the information management apparatus according to the second embodiment of the present invention, and a hierarchical structure tree of the document file, respectively.

As shown in FIG. 8(a), the contents of the document file "A. HTML" is the same as that shown in FIG. 3(a). However, as to the information file management in the WWW server, the portions encircled by the oblique lines in FIG. 8(b) are compressed. That is, the divided paragraph files are compressed by the compression means 211a, in a file division by the file dividing means 211 (cf. FIG. 7), and then stored in the storage 1001 (cf. FIG. 1).

Next, there will be explained an information management apparatus according to the third embodiment of the present invention.

Figure 9:
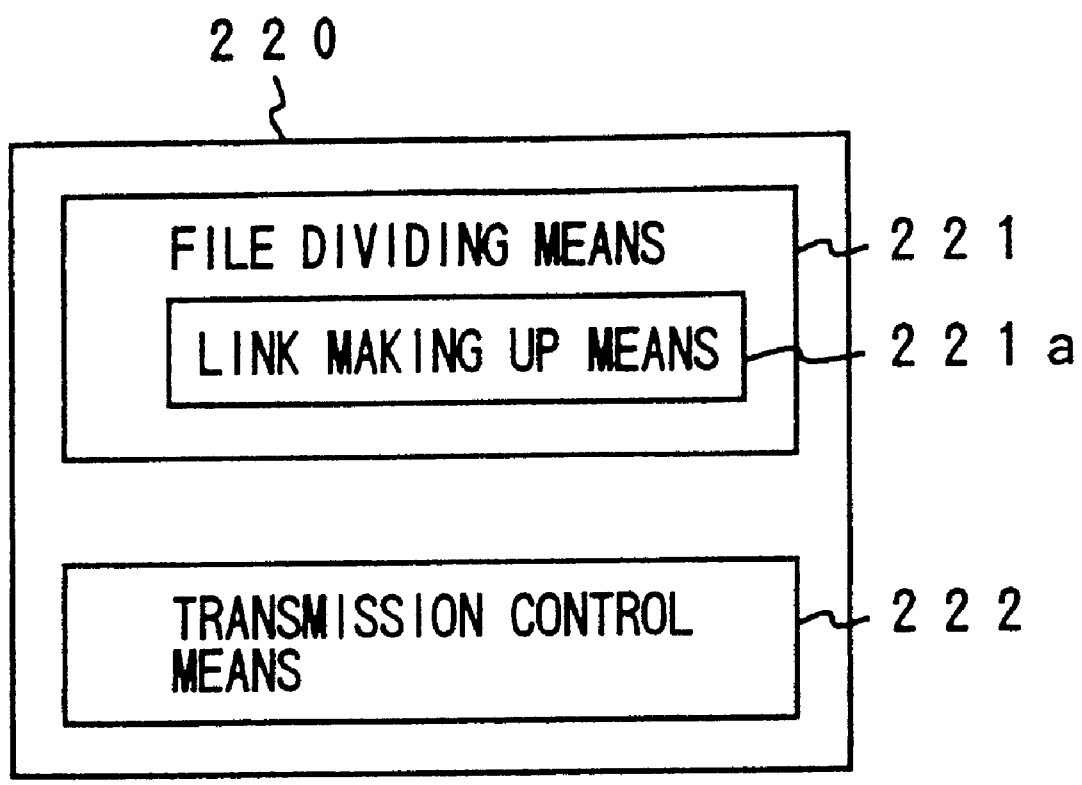
FIG. 9 is a schematic diagram of an information management program having a file dividing means and a transmission control means, the information management program being provided for an information management apparatus according to the third embodiment of the present invention.

FIG. 9 is a schematic diagram of an information management program having a file dividing means and a transmission control means, the information management program being provided for an information management apparatus according to the third embodiment of the present invention.

Incorporated into the information management apparatus 100 shown in FIG. 1 is an information management program 220 stored in the information management program recording medium 200a also shown in FIG. 1. As shown in FIG. 9, the information management program 220 has a file dividing means 221 and a transmission control means 222. The function of the transmission control means 222 is the same as that of the transmission control means 202 explained in connection with the first embodiment of the present invention. But, the file dividing means 221 includes a link making up means 221a for making up links each to paragraph information disposed just before the associated one of the divided pieces of paragraph information. Link making up means 221a also makes up links each to paragraph information disposed just after the associated one of the divided pieces of paragraph information. Thus, file dividing means 221 is somewhat different in its function from the file dividing means 201 explained in connection with the first embodiment of the present invention. The file dividing means 221 includes the link making up means 221a as mentioned above and makes up paragraph files each storing the associated paragraph information and also the links corresponding to the associated paragraph information, by the number corresponding to the number of pieces of paragraph information.

Figure 10:
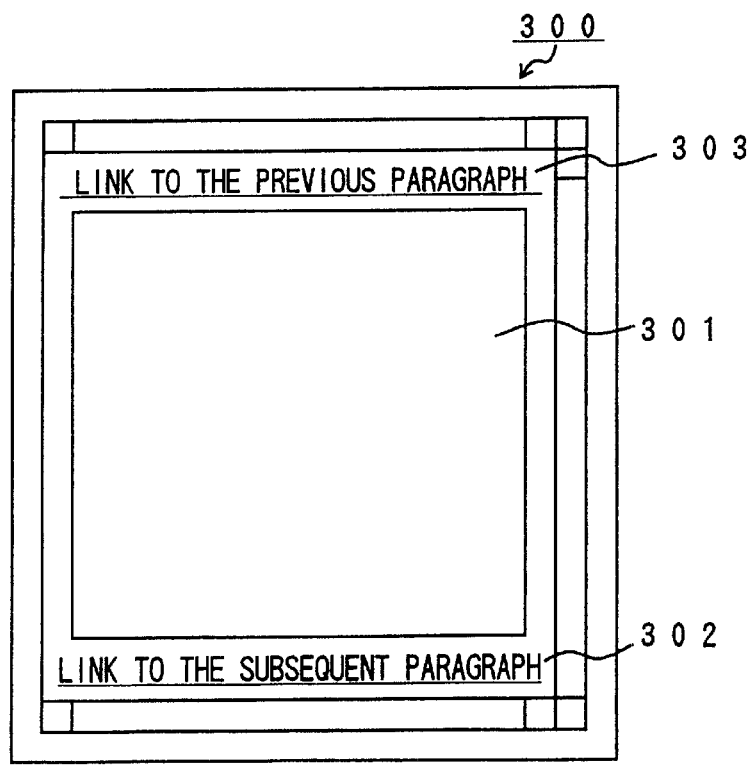
FIGS. 10(a) and (b) are illustrations showing a paragraph file made up by file dividing means in connection with the information management apparatus according to the third embodiment of the present invention, and a display screen in the client computer, respectively.

FIGS. 10(a) and (b) are illustrations showing a paragraph file made up by the file dividing means in connection with the information management apparatus according to the third embodiment of the present invention, and a display screen in the client computer, respectively.

According to the present embodiment, the link making up means 221a included in the file dividing means 221 makes up links. That is, as shown in FIG. 10(a), before and after certain paragraph information, a link to the previous paragraph information and a link to the subsequent paragraph information are made up link making up means 221a. When the paragraph file shown in FIG. 10(a) is designated by a user and then transferred to a client computer, the client computer displays a display screen as shown in FIG. 10(b). Specifically, on a display screen 300 in the client computer, paragraph information of the designated paragraph file is displayed in a paragraph display area 301. In addition, link information 302 to a paragraph file, which is disposed just after in logical structure with respect to the designated paragraph file, is emphatically displayed below the paragraph display area 301. When the user clicks with a mouse or the like on the link information 302 (emphasized display portion), a paragraph subsequent to the paragraph displayed now on the screen may be displayed. Likewise, with respect to the previous paragraph, link information 303 to a paragraph file, which is disposed just before in logical structure with respect to the designated paragraph file, is emphatically displayed above the paragraph display area 301. When the user clicks with a mouse or the like on the link information 303 (emphasized display portion), a paragraph preceding the paragraph displayed now on the screen may be displayed.

In order to display on the screen such link information 302 and 303 together with the designated paragraph files, link messages are appended. Specifically, when the file dividing means 221 divides the original file into a plurality of paragraph files, the link making up means 221a (cf. FIG. 9) included in the file dividing means 221 appends to the respective paragraph files link messages to paragraphs disposed just before and after in logical structure with respect to the paragraph file. Link making up means 221a then stores the paragraph files in the storage 1001 (cf. FIG. 1).

As mentioned above, according to the present embodiment, it is possible to readily call from a screen a paragraph located just before or after a paragraph now displayed on the screen, thereby improving operability for file reference by a user.

Next, there will be explained an information management apparatus according to the fourth embodiment of the present invention. The fourth embodiment corresponds to the information management apparatus according to the second embodiment of the present invention.

FIG. 11 is a schematic diagram of an information management program having a partial compression means and a transmission control means, the information management program being provided for an information management apparatus according to the fourth embodiment of the present invention.

Incorporated into the information management apparatus 100 shown in FIG. 1 is an information management program 230 stored in the information management program recording medium 200a also shown in FIG. 1. As shown in FIG. 11, the information management program 230 has a partial compression means 231 and a transmission control means 232.

The partial compression means 231 serves to make up an alternate file to be substituted for a logical structure of information file. The alternate file is made up by means of compressing partially the paragraph information sections, except the header information, of the logical structure of information file. The transmission control means 232 serves to transmit an alternate file (cf. FIG. 12) made up by the partial compression means 231, instead of the logical structure of information file requested, upon receipt of a transmission request of the logical structure of information file.

FIGS. 12(a) and (b) are file construction views of the original file and the alternate file in connection with the information management apparatus according to the fourth embodiment of the present invention, respectively.

FIG. 12(a) shows the original type of logical structure of information file "A. HTML". As shown in FIG. 12(a), the contents of the file "A. HTML" is the same as that shown in FIG. 3(a). FIG. 12(b) shows an alternate file made up by means of compressing partially the paragraph information sections of the original file "A. HTML". As shown in FIG. 12(b), the alternate file is compressed in the portion of paragraphs. The partial compression means 231 makes up such an alternate file partially compressed from the original file. The transmission control means 232 transmits the alternate file thus made up to the client computer. Upon receipt of the alternate file, the client computer displays first the header portion not compressed, while the compressed alternate file is thawed, or is subjected to an expansion processing, in accordance with the WWW browser function. Thus, it is possible to perform at high speed the file transfer and the display of the header portion. It is noted that the alternate file is made up and managed in the form of a single file, but not one comprising a plurality of files divided as in the above-mentioned first to third embodiments of the present invention.

Next, there will be explained an information management apparatus according to the fifth embodiment of the present invention. The fifth embodiment is a modification of the information management apparatus according to the fourth embodiment of the present invention.

Figure 13:
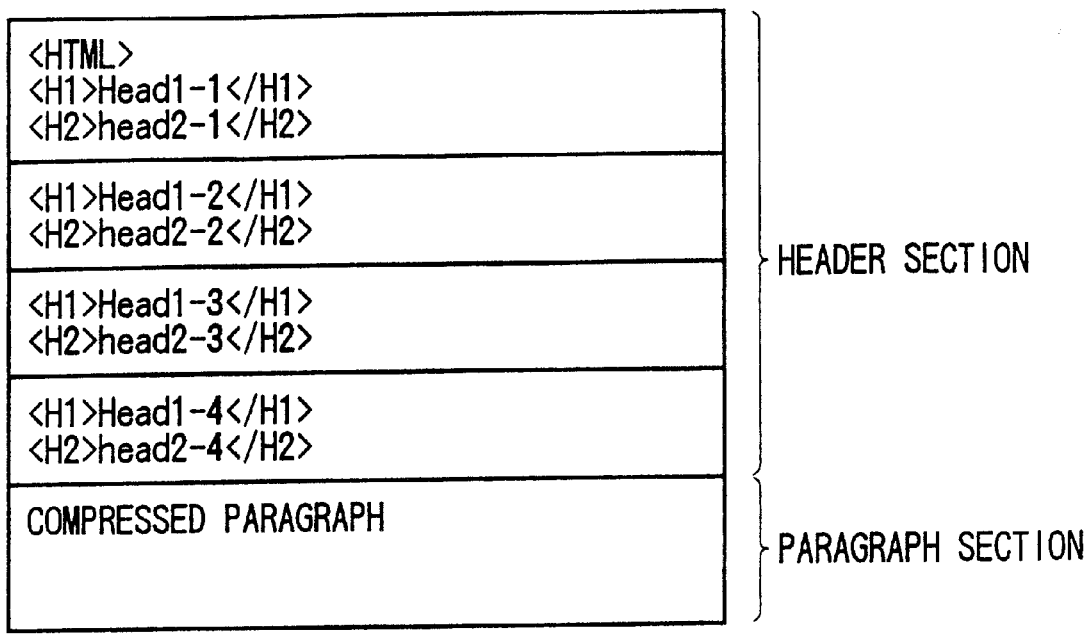
FIG. 13 is a file construction view of the alternate file in connection with the information management apparatus according to the fifth embodiment of the present invention.
Figure 14:
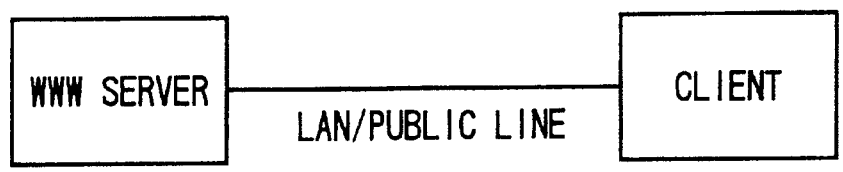
FIG. 14 is a typical illustration of an information providing system utilizing the conventional Www.

FIG. 13 is a file construction view of the alternate file in connection with the information management apparatus according to the fifth embodiment of the present invention.

According to the alternate file in the fifth embodiment, the paragraph portions are not scattered as in the alternate file in FIG. 12(b), but are gathered as shown in FIG. 13. This arrangement of the paragraph portions makes it possible to promptly display header information omitting the necessity of re-editing the header information at the client computer end, and also to perform the file transfer at high speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information management apparatus for managing an information file comprising a plurality of pieces of paragraph information and header information associated with the pieces of paragraph information according to a logical structure of the information file, said information management apparatus comprising file dividing means for dividing the information file according to the logical structure thereof, said file dividing means comprising:

means for producing a plurality of paragraph files each including one or more of the pieces of paragraph information; and means for producing a header management file comprising header information and link information, the header information having been extracted from the information file based on the logical structure thereof and the link information indicating a link to at least one of the paragraph files including the paragraph information with which the extracted header information is associated by the logical structure of the information file.

2. An information management apparatus according to claim 1, further comprising a transmission control means responsive to a transmission request for a logical structure of information file for transmitting the header management file associated with the logical structure of information file, and for transmitting, upon receipt of a transmission request based on a link included in the header management file, a paragraph file linked to the header management file.

3. An information management apparatus according to claim 1, wherein said file dividing means includes a link making up means for making up a link to a previous paragraph information and a link to a subsequent paragraph information with respect to each of the plurality of pieces of paragraph information, and makes up the paragraph files in which the pieces of paragraph information and the associated links are stored.

4. A recording medium encoded with a program for managing an information file comprising a plurality of pieces of paragraph information and header information associated with the pieces of paragraph information according to a logical structure of the information file, said information management program comprising file dividing program instructions for:

producing a plurality of paragraph files each including one or more of the pieces of paragraph information; and producing a header management file comprising header information and link information, the header information having been extracted from the information file and the link information indicating a link to at least one of the paragraph files including the paragraph information with which the extracted header information is associated by the logical structure of the information file.

5. An information management program recording medium according to claim 4, wherein said information management program further comprises a transmission control means responsive to a transmission request for a logical structure of information file for transmitting the header management file associated with the logical structure of information file, and for transmitting, upon receipt of a transmission request based on a link included in the header management file, a paragraph file linked to the header management file.

6. An information management apparatus for a document server, said apparatus comprising:

a management table generator extracting header information from an information file formatted in accordance with a markup language, the header information indicating a hierarchical structure of the information file; and a file divider generating based on hierarchical structure of the information file a plurality of paragraph files each including paragraph information from the information file and each having a link thereto from a header included in the header information.

7. An information management apparatus according to claim 6, further comprising a transmission controller reading the header information responsive to a reference request from a client of the document server and transmitting to the client a paragraph file selected in accordance with a link thereto from a header indicated by the reference request.

8. A method of information management in a document server, the method comprising:

extracting header information from an information file formatted in accordance with a markup language, the header information indicating a hierarchical structure of the information file; and generating based on the hierarchical structure the information file a plurality of paragraph files each including paragraph information from the information file and each having a link thereto from a header included in the header information.

9. A method of information management according to claim 8, further comprising reading the header information responsive to a reference request from a client of the document server and transmitting to the client a paragraph file selected in accordance with a link thereto from a header indicated by the reference request.

* * * * *